Oct. 4, 1966  E. D. RIGGS ETAL  3,277,439
AUTOMATIC SWITCHING AND TRANSDUCER CONTROL UNITS FOR SEISMIC
WEIGHT DROPPING SYSTEMS
Original Filed Oct. 12, 1962  4 Sheets-Sheet 4

INVENTORS.
Emmet D. Riggs.
Clifford D. Dransfield.

BY Charles F. Steininger
ATTORNEY.

United States Patent Office 3,277,439
Patented Oct. 4, 1966

3,277,439
AUTOMATIC SWITCHING AND TRANSDUCER CONTROL UNITS FOR SEISMIC WEIGHT DROPPING SYSTEMS
Emmet D. Riggs and Clifford D. Dransfield, Dallas, Tex., assignors to The Atlantic Refining Company, Philadelphia, Pa., a corporation of Pennsylvania
Continuation of application Ser. No. 230,066, Oct. 12, 1962. This application July 30, 1965, Ser. No. 477,656
6 Claims. (Cl. 340—15.5)

This is a continuation application of application Serial No. 230,066, filed October 12, 1962, now abandoned.

The present invention relates to an improved automatic switching and transducer control system. More specifically, the present invention relates to an improved high-speed automatic switching and magnetic transducer control system for seismic exploration purposes. Although the improved automatic switching control unit and the improved transducer control unit can be used separately for various purposes, best advantage can be obtained by utilizing the two units in combination as part of a portable seismic weight dropping recording system.

In the field of seismic exploration, the use of weight dropping equipment to generate seismic disturbances is rapidly achieving importance. This type of seismic exploration is used especially in areas where conventional seismic exploration produces poor records. The weight dropping technique achieves its improved results for various reasons, probably one of the most significant being the step of integrating a large number of relatively weak seismic signals to produce a usable seismic trace. As is well-known in the art, the process of adding a large number of signals improves the signal-to-noise ratio by canceling the randomly-occurring and horizontally-traveling energy and emphasizing the reflected signals.

Although this particular aspect of the weight dropping technique improves the end result, it also presents unique problems not found in conventional seismic operations. For instance, because a large number of drops are required to produce a usable seismic trace, a sustained, high-speed drop-record-add sequence must be maintained in order to produce an economical method of exploration. It is generally accepted that if a sustained drop rate of one drop every 10 seconds is maintained the cost of weight dropping exploration is not prohibitive. In order to maintain this high production rate it is necessary to automate the recording process to prevent operator fatigue.

To date, several semiautomatic field recorders are available for use with seismic weight dropping operations. At least one of these recorders records the signal generated by each weight drop and at the end of a predetermined number of drops integrates the previously recorded signals and rerecords the integrated trace. This operation is repeated until a predetermined number of summation traces are produced.

Even with the semiautomatic recording systems such as described above, many serious problems remain unsolved. For instance the drop-record sequence is not fully automatic and the operator must remain fully alert to insure that various control circuits are reset and closed at the proper times, that the signal received is actually being recorded, and that the summing circuits are in proper working order. These requirements must be accomplished in addition to the operator's routine duties such as insuring that the weight drops approximately every 10 seconds.

Another problem encountered in the present-day equipment arises from the continuous operation of the recording drum. After each weight drop, a signal is recorded on one trace of a magnetic tape and after a predetermined number of traces are recorded, they are summed and added to a second tape. After the add step the original traces are erased and a new set is recorded on the same tape. Due to the continuous, relatively high tape velocity, the tape and the transducers are subjected to wear requiring frequent inspections and periodic replacements.

It is, therefore, an object of the present invention to provide an improved automatic switching and magnetic transducer control system for seismic exploration.

Another object of the present invention is to provide an improved, dependable automatic switching and magnetic transducer control system that can be operated in the field with minimum maintenance.

Another object of the present invention is to provide an improved, high-speed, automatic switching and magnetic transducer control system that requires minimum operator supervision and visually indicates the status of the weight dropping operations and the signals being received.

Another object of the present invention is to provide a flexible, high-speed switching control unit adapted to control the transducer control unit's switching and transducer raising and lowering operations.

It is another object of the present invention to provide an improved automatic transducer control unit that switches received seismic signals to appropriate transducers in accordance with instructions from the switching control unit.

Another object of the present invention is to provide an automatic magnetic transducer raising and lowering means located within the transducer control unit that produces minimum wear on the recording medium.

Another object of the present invention is to provide a simplified improved magnetic transducer raising and lowering system suitable for portable recorders.

These and other objects of the present invention will be understood from the following description taken with reference to the attached drawings, wherein.

Figure 1:
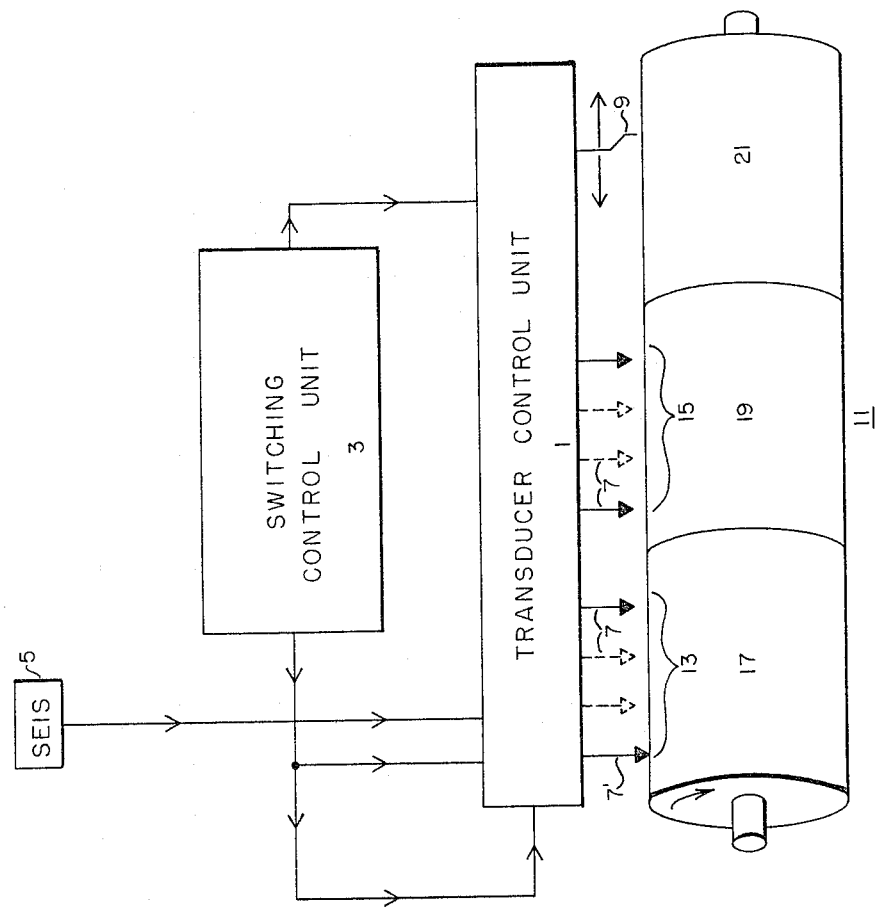
FIGURE 1 shows a block diagram of the over-all invention.

FIGURE 1 shows the over-all invention being used as part of a seismic recording system. The arrangement as shown is designed for use with production type weight dropping operations. That is, exploration where weight dropping operations are conducted at high speed for sustained periods of time. The invention as shown minimizes operator duties and provides means for periodic or continuous monitoring of the transducers in operation, the signals being received, and the summed signals recorded on the storage tape. Looking at FIGURE 1 in more detail, transducer control unit 1 is connected to switching control unit 3 and to seismometer 5. Transducer control unit 1 includes a plurality of magnetic transducers 7 and a visible writing transducer 9. Magnetic transducers 7 are broken into groups 13 and 15. Group 13 is positioned over recording surface 17, group 15 is positioned over recording surface 19, and transducer 9 is positioned over recording surface 21. Surfaces 17, 19, and 21 may be mounted on the same drum 11 or on different drums. Magnetic transducer 7' of group 13 is shown contacting recording surface 17 while the remaining transducers 7 and 9 in FIGURE 1 are positioned above their respective recording surfaces.

*Transducer control unit*

Figure 2:
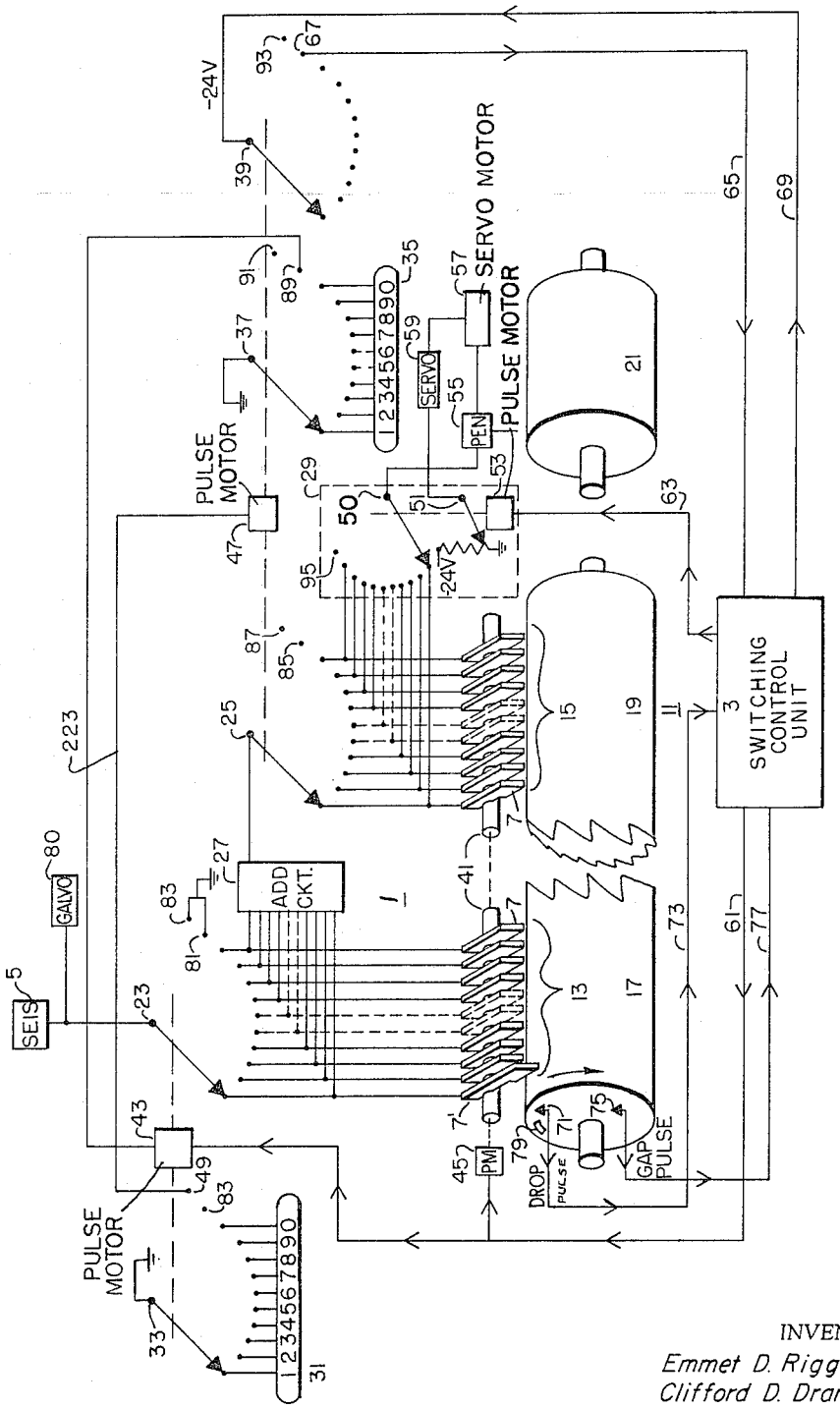
FIGURE 2 shows a schematic diagram of the transducer control unit in conjunction with the switching control unit.

FIGURE 2 is a schematic diagram of one instrumentation of the over-all invention shown in FIGURE 1. Switching control unit 3, FIGURE 2, is shown below recording drum 11 and seismometer 5 is shown above recording drum 11. Transducer control unit 1 is shown intermediate to seismometer 5 and recording drum 11. Control unit 1 includes sequential switching means 23 connected between seismometer 5 and transducer group 13, sequential switching means 25 connected between transducer group 15 and add circuit 27, playback switching means 29 connected to switching means 25, indicator tube 31 connected to sequential switching means 33, indicator tube 35 connected to sequential switching means 37, sequential switching means 39, and transducer positioning means 41. Looking at control unit 1 in more detail, pulse motor 43 is mechanically connected to switching means 23 and 33; pulse motor 45 is mechanically connected to transducer raising and lowering means 41; pulse motor 47 is mechanically connected to switching means 25, 37, and 39 and electrically connected to contact 49 of switching means 33; and playback switch means 29 includes sequential switching means 50 and potentiometer 51 ganged to pulse motor 53. Switching means 50 is connected between visible recording transducer 55 and group 15 of magnetic transducers 7. Servomotor 57 and servo 59 are connected between potentiometer 51 and visible recording transducer 55. For purposes of brevity, transducer raising and lowering means 41 will be referred to hereinafter as transducer positioning means 41.

Considering now the connections between switching control unit 3 and components in the transducer control unit, pulse motors 43 and 45 are connected in parallel to control unit 3 by conductor 61. Pulse motor 53 is connected to control unit 3 by conductor 63 and switching means 39 is connected to control unit 3 by means of conductor 65 connected to contact 67 and conductor 69 connected to the tongue of 39. The tongue of weight drop switch 71 is connected by conductor 73 to control unit 3 and the tongue of tape gap switch 75 is connected by conductor 77 to control unit 3.

Various commercially available products can be used for each of the components represented in block form in FIGURE 2. Seismometer 5 can be a single seismometer or a plurality of seismometers. Recording drum 11 can be a single recording drum containing sections 17, 19, and 21 or can be separate drums driven in a conventional manner to compensate for speed and diameter variations if such exist. Indicator tubes 31 and 35 can be Burroughs "Nixie" indicator tubes. Sequential switching means 23 ganged to 33 and sequential switching means 25 ganged to 37 and 39 can be conventional multi-wafer rotary switches. Pulse motors 43, 45, 47, and 53 can be conventional step motors such as produced by Leadex Inc., Dayton, Ohio. Sequential switching means 50 ganged to potentiometer 51 can be a conventional wafer switch ganged to a potentiometer. Since the type of recording used in sections 17 and 19 are not important to the inventive concept, obvious components necessary to practice a given type of recording are not shown. Applicants prefer to use FM recording, however.

Before considering the detailed operation of the various components, let us broadly describe the operation of the system as shown in FIGURE 2. Switching control unit 3 controls or programs the operations through a record sequence, an add sequence, and a playback sequence, however, the operator can interrupt the automatic operation of the switching control unit when desired. During the record sequence, a seismic signal is recorded on section 17 during one revolution of the drum, a "dead" revolution follows allowing time for the weight to be raised and dropped, and a second seismic trace is recorded on the third revolution. This sequence continues until the desired number of seismic traces are recorded on section 17. After the last seismic trace is recorded on 17 in the record sequence, switching control unit 3 causes the system to automatically go into the add sequence without a "dead" cycle. That is, the recorded traces are read out, added, and recorded as a single trace on 19. At the completion of the last add sequence, switching control unit 3 automatically causes the integrated traces recorded in section 19 to be played back sequentially and recorded on a visible monitor record 21.

Consider now the operation of transducer control unit 1, FIGURE 2, in more detail. At the start of the record sequence, drum 11 is rotating and as ramp 79 passes under the tongue of weight drop switch 71, a pulse is sent on conductor 73 to switching control unit 3 and by radio link, not shown, to the weight drop truck, not shown. The weight is released and the impact of the weight generates a seismic wave in the ground which is received by seismometer 5. After the weight is released, ramp 79 passes under the tongue of tape gap switch 75, sending a pulse to control unit 3 switching it to the record sequence. The seismic wave received by 5 is translated into an electrical signal and transmitted through switch 23 to magnetic transducer 7' where it is recorded as the first trace on section 17 of recording drum 11. During this recording operation, indicator tube 31 displays figure 1 indicating that the first transducer in group 13 is in operation. Before the completion of the recording cycle, ramp 79 again passes under tongue of switch 71; however, this time switching control unit 3 prevents voltage from being applied to switch 71 and therefore no signal is produced. During this "dead" revolution, ramp 79 again passes under the tongue of switch 75 which is now energized by control unit 3 producing a pulse on conductor 77 which passes through control unit 3 and on conductor 61 back to pulse motors 43 and 45. The pulse causes pulse motor 45 to rotate transducer positioning means 41 a predetermined amount causing transducer 7' to be raised above the surface of 17 and the next transducer to be lowered to the surface of 17. Simultaneously, the pulse causes pulse motor 43 to step the tongues of switching means 23 and 33 in a counterclockwise direction to their next contact. As ramp 79 again moves under the tongue of weight drop switch 71, switching control unit 3 allows a signal to be produced causing the weight to drop again as described heretofore. This sequence of operations is repeated until the desired number of traces are recorded on section 17. During the revolution following the recording of the last trace, switch 75 generates a pulse in the same manner as described heretofore. This pulse causes pulse motor 45 to move transducer positioning means 41 to a new position which lowers all of the transducers in group 13 to the surface of section 17 and the first of the transducers in group 15 to the surface of section 19. The pulse also actuates pulse motor 43 causing it to move the tongues of switches 23 and 33 to contacts 81 and 82 respectively; simultaneously, control unit 3 causes the transducers in group 13 to play out their respective traces. The traces are added in add circuit 27 and sent through switching means 25 to the first transducer in group 15 where the integrated trace is recorded as the first trace on storage section 19. At the end of the add sequence, control unit 3 energizes the tongue of tape gap pulse switch 75 so that the next revolution is a "dead" cycle as described heretofore. During this "dead" cycle, pulse motor 45 again rotates 41 so that all transducers in group 13 are raised from surface 17 and the first transducer in group 15 is raised from surface 19. A second record sequence follows in the same manner described heretofore at the end of which the integrated traces are recorded as the second trace on section 19. This sequence of operations is repeated until the desired number of integrated traces are recorded on storage section 19.

It should be understood that the number of transducers in groups 13 and 15 can vary, but for purposes of illustration ten transducers are shown in each group. For purposes of simplicity, transducers necessary to record timing traces, etc., are not shown. Of course, if two or more seismometer patches 5 are used, transducer groups 13 and 15 and their associated circuitry would merely be duplicated.

Block 80, connected in parallel to switching means 23, is an optional visual monitoring means that enables the operator to check incoming seismic signals. In the illustrated form, block 80 is a conventional moving coil galvanometer that provides the observer with an instantaneous visual check on the quality of the incoming seismic signal. The signal is presented by projecting an illuminated trace on an opaque screen. When it is desirable to play back the integrated traces recorded on section 19 so that they may be checked visibly on monitor record 21, playback switching system 29 can be utilized. Unless otherwise prevented by a manual stop located in switching control unit 3 and described hereinafter, the integrated traces on 19 are automatically played back on monitor 21 after the tenth trace has been recorded on section 19. Switch 50 sequentially reads out from the transducers in group 15 the integrated signals, and pen 55 re-records them on section 21. Potentiometer 51, which is mechanically coupled to sequential switch 50, applies the appropriate electrical voltage to servomotor 59 and servomotor 57 to locate pen 55 over the appropriate channel on 21. Pulse motor 53 operates sequential switch 50 and potentiometer 51 by pulses received on conductor 63 from switching control unit 3. Sequential switch 39 applies the necessary pulse to activate playback system 29.

Switching control unit

Figure 3:
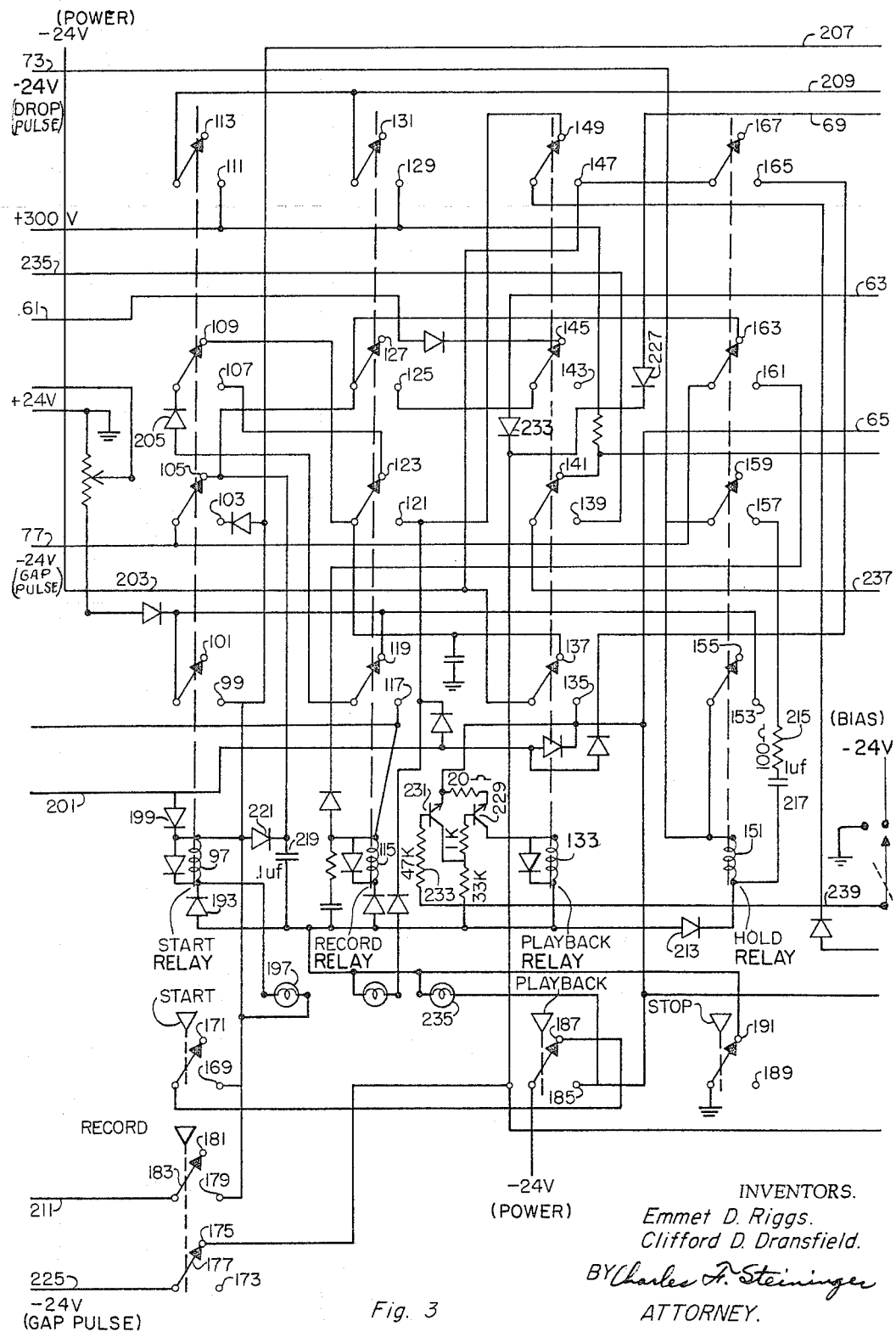
FIGURE 3 shows a circuit diagram of the switching control unit.

FIGURE 3 illustrates one switching control unit 3 that can be used in FIGURE 2. As shown in FIGURE 3, the control unit includes an array of relays arranged with a plurality of diodes and transistors to form a switching matrix. The unit includes a start relay, a record relay, a playback relay, and a hold relay. The start relay includes coil 97 and contacts 99, 101, 103, 105, 107, 109, 111, and 113. Each set of contacts is selectively connected by a relay tongue. Record relay includes coil 115 and contacts 117, 119, 121, 123, 125, 127, 129, and 131 together with their appropriate relay tongues. Playback relay includes coil 133, contacts 135, 137, 139, 141, 143, 145, 147, and 149 together with their appropriate relay tongues. The hold relay includes coil 151 and contacts 153, 155, 157, 159, 161, 163, 165, and 167 together with their appropriate relay tongues. The manual start switch includes contacts 169 and 171 with its appropriate switch tongue while the record switch includes contacts 173 and 175 with tongue 177 and contacts 179 and 181 with tongue 183. The playback switch includes contacts 185 and 187 with its appropriate switch tongue. The stop switch includes contacts 189 and 191 with its appropriate switch tongue. Conductors 61, 63, 65, 69, 73, and 77 shown in FIGURE 2 are also shown as the same conductors in FIGURE 3.

In describing the operation of the switching control unit, a normal cycle of operations to include the record sequences, the add sequences, and the playback sequence will be discussed. Only brief reference will be made to the functions of components in transducer control unit 1, FIGURE 2, since they have been described heretofore. Referring to FIGURE 3, the start switch is depressed, moving the tongue of the switch to contact 169. A minus 24 volts is then applied to coil 97 of the start relay by the path formed by playback switch contact 187 through the tongue of the start switch and contact 169, coil 97, isolation diode 193, and back to ground through contact 191 of the stop switch. With the application of this voltage to coil 97, the tongues of the start relay are moved to their respective lower contacts and start lamp 197 is energized. Power is supplied from the top of start relay coil 97 through isolation diode 199 through conductor 201 to the tongue of tape gap switch 75, FIGURE 2, on the recording drum 11. Simultaneously, 400 cycle power is applied to a hysteresis synchronous motor, not shown, driving recording drum 11, FIGURE 2. After the start relay is initially energized, the relay is held in the closed position by a holding circuit after the start switch is released and until the record relay is activated. The holding circuit is established from minus 24 volt bus 203, through the tongue and contact 137 of the playback relay, the tongue and contact 123 of the record relay, contact 107 closed on by the tongue of the start relay, isolation diode 205, the tongue and contact 119 of the record relay, and to the tongue and contact 99 of the start relay. Simultaneously with the establishment of the holding circuit, the minus 24 volts applied from bus 203 through contact 99 is sent through conductor 207 to establish a cyclic output for recording a timing trace, not shown. The 300 volts applied through contact 111 and the tongue of the start relay is sent to conductor 209 to the add modulator, not shown. The 300 volts is placed on the add modulator, not shown, so that the information recorded during the recording cycles, to be described hereinafter, will not be erased by subsequent passes of the transducers over the same trace after a recording is made. This is a safety feature in case transducer positioning system 41, FIGURE 2 does not function.

The record switch is depressed to start the record cycle. With the closing of the record switch, minus 24 volt power is sent from start relay coil 97 through contact 179 and tongue 183 of the record switch through conductor 211 to the tongue of drop switch 71, FIGURE 2. This same voltage is also sent to the communication unit, not shown, to turn on the carrier for the radio link to the weight drop truck. This carrier and its accompanying tone are used to signal the weight truck that the weight is to be dropped momentarily. A suitable carrier and tone generator are described in copending application 206,860 owned by a common assignee. With the energizing of tongue 71, FIGURE 2, ramp 79 again moves under tongue 71 closing the circuit and applying 24 volt power through conductor 73 to the communication unit, not shown, cutting off the tone and causing the weight to drop. Simultaneously with the closing of switch 71 by ramp 79, the hold relay, FIGURE 3, is actuated so that the record relay will remain in the close position when it is energized. The closing of the hold relay is accomplished by the pulse from the weight drop switch 71, FIGURE 2, to conductor 73, FIGURE 3, to the top of coil 151 in the hold relay through isolation diode 213 and through contact 191 and the tongue of the stop circuit to ground. Resistor 215 and capacitor 217 in the hold relay circuit combine to form a time-constant circuit which is charged through contact 157 and is utilized to keep the hold relay in the closed position momentarily after the weight drop pulse is removed from relay 151. This short time delay allows the closing and latching of the record relay before the hold relay opens.

The record relay is closed by a pulse from gap pulse switch 75, FIGURE 2. This pulse originates from power supplied from bus 201, FIGURE 3, which is energized in conjunction with the start relay. The gap pulse is applied to the record relay through line 77, contact 161 of the hold relay, and coil 115 of the record relay.

The closing of the record relay interrupts the holding circuit to the start relay by opening of contact 123 of the record relay. With the closing of the record relay and the resulting breaking of the holding circuit to the start relay, the start relay momentarily remains closed by virtue of the charge on capacitor 219 which is in series with isolation diode 221. This delay is necessary to allow the closing and latching of the record relay before the hold circuit in the start relay opens. A short time after the relay opens the time constant circuit of the hold relay, i.e. resistor 215 and capacitors 217, discharges and the hold relay opens so that only the record relay is energized. As the drum nears the completion of the record cycle, ramp 79, FIGURE 2, again passes under tongue 71 of the weight drop switch. Since the record switch is no longer depressed, a drop pulse is not developed. However, the tongue of the gap switch 75 is energized, and therefore, a pulse is sent on conductor 77 through the tongue and contact 163 of the hold relay, the tongue and contact 125 of the record relay, the tongue and contact 145 of the playback relay, conductor 61 to pulse motor 45, FIGURE 2. This pulse causes 45 to rotate 41 a predetermined amount, raising magnetic transducer 7′ and lowering the next transducer to the recording position on section 17. Since pulse motor 43 is connected in parallel with 45, the same pulse causes 43 to move the tongue of sequential switch 23 and 33 in counterclockwise direction to their next adjacent contacts. A portion of the pulse voltage utilized to move the stepping motors described above is also used for a second operation. Referring again to FIGURE 3, a portion of the pulse voltage is applied through the tongue and contact 105 of the start relay to capacitor 219 which assumes a charge and simultaneously applies a voltage through diode 221 to coil 97. This voltage energizes the coil of the start relay after capacitor 219 has received an appropriate charge closing the start relay. As pointed out heretofore, the closing of the start relay interrupts the hold circuit for the record relay which was established through contact 109 of the start relay. Therefore, the record relay opens a short instant of time after the start relay closes. This operation terminates the record cycle and the equipment is back in the start cycle and is ready for a second drop of the weight.

It should be noted at this point that the drop-record sequence is so rapid that the "dead" revolution is required to provide time to hoist the weight.

The recording sequence is repeated ten times, and at the end of the tenth recording the tongue of sequential switch 23, FIGURE 2, is positioned on the tenth contact of 23, the tongue of switch 33 is on the contact connected to number zero of indicator tube 31, and the tenth magnetic transducer in group 13 is in contact with the surface of 17. During the revolution the same sequence of events follows as described heretofore, i.e., a pulse on conductor 61 causes pulse motor 43 to advance the tongue of sequential switch 23 to contact 81 and the tongue of sequential switch 33 to contact 82. The pulse causes 45 to rotate 41 to its next position, causing all transducers in group 13 to contact the surface of section 17 and the first transducer in group 15 to contact the surface of 19. As the drum continues to revolve, the transducers in group 13 simultaneously read out their respective traces after which they are integrated in conventional add circuit 27 and rerecorded by the first transducer in group 15. As the record cycle nears completion, ramp 79 again moves under the tongue of 71 which is de-energized since the record switch is open and then under the tongue of 75 which is energized because the record relay is closed. The pulse from 75 is sent to 43 and 45 by the route described before. The generated pulse causes pulse motor 45 to rotate 41 to the next position which raises all transducers above drum 11 and causing pulse motor 43 to rotate the tongues of switches 23 and 33 to contacts 83 and 49 respectively. Note that the last two contacts on 23 and 33 are not connected to their respective indicator tubes. As the drum approaches the end of the revolution following the add revolution, ramp 79 passes under the tongue of switch 75 producing a pulse which travels in the previously described manner to pulse motor 45 and 43. Pulse motor 45 rotates 41 incrementally and causes magnetic transducer 7′ to again move to the operating position and pulse motor 43 causes the tongue of sequential switch 23 to move to the contact connected to transducer 7′. In addition, pulse motor 43 causes the tongue of sequential switch 33 to move to the contact that illuminates numeral 1 in tube 31. The equipment is now ready for the second series of ten weight drops.

The start relay has been energized since the completion of the tenth record cycle, indicator tube 31 is illuminated with numeral 1, and indicator tube 35 is illuminated with numeral 2. The second series of ten weight drops are conducted in the same manner as described heretofore. The second ten traces are integrated and rerecorded on storage section 19 by the second transducer in group 15. This process is continued until a total of 100 drops are integrated and recorded as ten final traces on storage section 19.

With the completion of the tenth add sequence (at which time the tongue of selector switch 23 is on contact 81) the next pulse from switch 75 produces a pulse which moves the tongue of 23 to contact 83. As the tongue of switch 33 is simultaneously moved from contact 82 to 49, a pulse is sent on conductor 223 to pulse motor 47. Pulse motor 47 moves the tongues of switches 25, 37, and 39 to contacts 85, 89, and 67 respectively. Indicator tube 35 is turned off. Pulse motor 45 is activated simultaneously with pulse motor 43 and steps 41 to a position that raises all transducers in group 13 above section 17 and lowers all transducers in group 15 onto the surface of section 19. It should be noted that when the tongue of switch 37 is on contact 89, pulse motor 43 is disabled in a conventional manner to prevent pulses originating from switch 75 from activating pulse motor 43. This is necessary since the drum must rotate ten times while the traces on section 19 are played out and recorded on monitor record 21. When switches 25, 37, and 39 are moved to contacts 85, 89, and 67 respectively, a new route from switch 75 to the switching control unit is utilized. This new route originates from switch 75, FIGURE 2, and enters switching control unit 3, FIGURE 3, on conductor 225 (not shown in FIGURE 2) through tongue 177 and contact 175 of the record switch through isolation diode 227, conductor 69, to the tongue and contact 67 of switch 39, FIGURE 2, and conductor 65 back to switching control unit 3 and then to the emitters of transistors 229 and 231, FIGURE 3, which combine to make up a two-stage pulse amplifier as shown. This pulse applies power to the two-stage amplifier. It should be noted that transistor 231 is connected through a 47K resistor 233 by line 239 to the matrix stop circuit (not shown). This connection acts as a second control circuit. That is, the playback relay cannot be energized unless a negative voltage is applied on line 239 to transistor 231. Line 239 is connected to ground during all portions of the operation except the playback sequence at which times it is connected to a negative voltage. If the negative voltage applied to line 239 is removed, the playback relay is opened.

The pulse which closes the playback relay also acts through conductor 63 to clear the playback matrix 29, FIGURE 2, i.e., causing the tongue of selector switch 33 to move to its first position. After the playback relay is closed an independent hold circuit is developed via the 24 volt bus 203, FIGURE 3, through contact 135 to the emitters of transistors 229 and 231. After the cessation of the pulse, the playback relay is maintained in the closed position by this 24 volt power source. Note that as long as the playback relay is energized, lamp 235 is energized through contact 135 of the playback relay.

When the tongue of the playback relay is moved to contact 143, conductor 61 leading to pulse motor 45, FIGURE 2, is inoperative and signals cannot activate transducer positioning means 41 during the playback operation.

With the activation of the playback relay as described heretofore, switch 75 produces a signal on conductor 63 causing pulse motor 53, FIGURE 2, to move the tongue of switch 50 and potentiometer 51 to the start position as shown. The trace under the first transducer in group 15 is played out and rerecorded on monitor record 21 by pen 55. The next pulse from switch 75 passes on conductor 225, FIGURE 3, through tongue 177 and contact 175 of the record switch, isolation diode 233, conductor 63 to pulse motor 53, FIGURE 2, which moves the tongue of switch 50 and potentiometer 51 to the next adjacent position. The reference voltage developed by potentiometer 51 is sent to servo 59 causing servomotor 57 to drive pen 55 to the next trace position on monitor record 21. The next transducer in group 15 reads out its respective trace on section 19 and records same on the monitor record in the same manner as described heretofore. This playback operation is repeated until all traces on storage section 19 have been played back and rerecorded on monitor record 21. The next pulse produced by the tape gap switch 75 disrupts the 24 volts applied to the playback matrix stop circuit conductor 239 and turns off transistor amplifier 231, causing the playback relay to be de-energized. This same pulse simultaneously moves the tongue of switch 50, FIGURE 2, potentiometer 51, and pen 55 to the start position for the next playback cycle. After the playback relay is opened, all relays in the switching control unit 3 are opened, the drum motor turned off, and all indicator lights are de-energized. Before the start of another record sequence, conductor 61 is pulsed manually to move the associated switches to the start position.

*Transducer positioning means*

Figure 4:
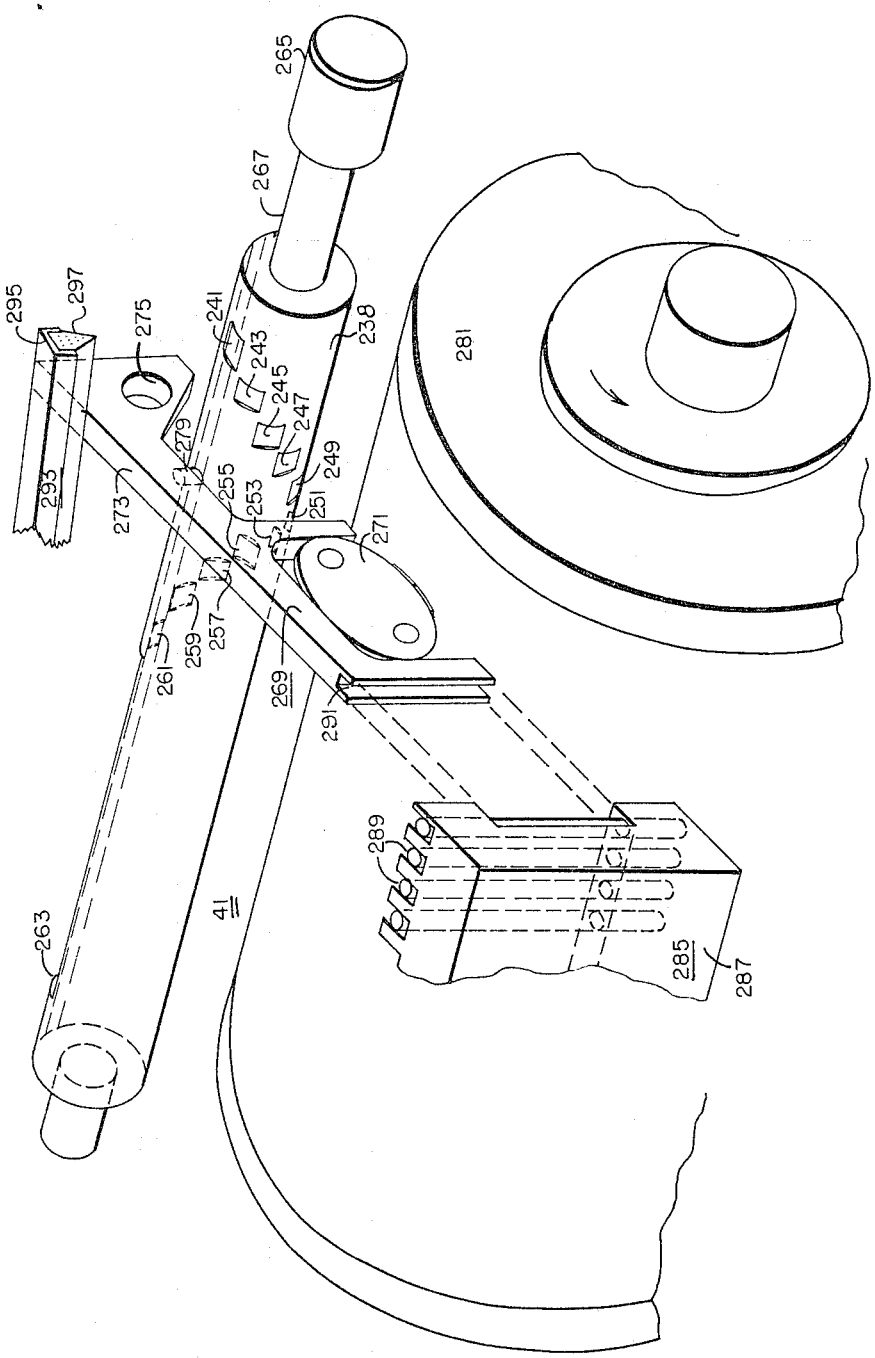
FIGURE 4 shows an isometric drawing of the transducer raising and lowering means.

FIGURE 4 shows an isometric drawing of transducer positioning means 41. The illustrated embodiment includes cylindrical, rotatable member 238 containing a plurality of indentations 241, 243, 245, 247, 249, 251, 253, 255, 257, 259, 261, and 263. Connector 267 joins 238 and stepping means 265. The indentations are arranged around the circumference of the cylindrical, rotatable member in a predetermined manner according to the operations to be accomplished. For purposes of illustration the transducer positioning means is shown designed to operate with ten magnetic transducer means 269 in accordance with the operations used in the discussion of FIGURE 2. For purposes of simplicity, only one magnetic transducer means 269 is shown in conjunction with the transducer positioning means. Transducer means 269 includes magnetic transducer 271 connected to support arm 273 containing pivot aperture 275. For purposes of simplicity, the rod passing through aperture 275 is not shown. Button 279 projects from 273 and contacts the surface of cylindrical, rotatable member 238. The button normally rides on the surface of 238 and holds transducer 271 above the surface of recording drum 281. Guide assembly 285 is an optional feature with the transducer positioning means. The assembly includes body member 287 and guide rods 289. In the illustrated assembly 287 is a U-shaped body containing a plurality of parallel guides 289 secured between the projections of the U-shaped body. Each transducer means 269 is designed to move on a guide rod 289 by means of notch 291 located in the end of each support arm 273. An exploded view of this arrangement is shown for purposes of clarity. Guide assembly 285 serves to keep each transducer means in proper alignment so that the gap between the pole pieces in the transducer is always at right angles to the direction of drum rotation.

Broadly, transducer positioning means 41 functions to keep transducer means 269 from contacting the surface of drum 281 except during the recording and reading operations. This prevents excessive wear on magnetic transducer 271 as well as on the recording surface of drum 281. In order to reduce this wear to a minimum and yet maintain transducer-record surface contact during recording and reading operations, each transducer is maintained in a raised position except when it is engaged in actual recording or reading operations. This is done by arranging the indentations on 238 so that each indentation is under the button of its respective transducer means during the time when that particular transducer means is engaged in such operations. It has been found desirable to move the indentations under their respective buttons by incremental movements of member 238. Therefore, by knowing the sequence in which the magnetic transducers will be used, the indentations can be placed around the circumference of member 238 so that in a given number of incremental movements the desired sequence of operations can be performed. Referring specifically to the illustrated transducer positioning means 41, it can be seen that indentations 241 through 259 are designed to accommodate ten transducer means in a manner so that during a portion of one rotation of 238 transducer 271 and the nine transducers not shown are sequentially lowered to and raised from the recording surface of drum 281. Assuming that member 238 rotates clockwise, the transducers will be lowered and raised from right to left. Note that indentation 261 extends across the length of 238 and that all transducer means are lowered to the surface of 281 during the period the buttons rest on this indentation. The same is true of indentation 263; however, for purposes of clarity it is not shown extending the length of 238. It has been found that a conventional pulse motor such as shown in FIGURE 2 and described heretofore is satisfactory to move member 238 in a step-like fashion. The pulse motor can be mechanically connected to 238 in a fixed manner or can be connected through a detachable ratchet and gear arrangement. If bidirectional operation is required, two oppositely rotating pulse motors with their respective ratchets and gears can be used.

In the illustrated embodiment, member 238 is a stainless steel, nonmagnetic, ball-bearing mounted, cylindrical member. Transducer arm 273 is made of aluminum and rotates around a stainless steel bar containing positioning washers on each side of aperture 275. Body member 287 is made of aluminum and secures stainless steel, centerlessly ground, guide rods 289 as shown. Rod 289 forms line contact with notch 291. Friction is reduced to a minimum by the use of line contact and dissimilar metals as described. If desired, line contact between 287 and the rod, not shown, can be substituted for aperture 275. Cylindrical button 279 is made of nylon to reduce friction and wear. The indentations in 238 provide a maximum drop of 0.025 inch from the surface, allowing transducer 271 to be raised or lowered approximately 0.040 inch. It is desirable to lightly load or bias support arm 273 slightly forward of pivot aperture 275 to maintain close contact between 271 and 281 and to prevent pounding when the unit is mobile. Illustrated loading or biasing means 293 includes metal channel 295 and a V-shaped sponge rubber insert 297 secured to the channel.

The number of step positions through which member 238 can be moved in completing one revolution depends primarily on its diameter and the size of each indentation. The number of transducer means it can position simultaneously or sequentially depends on its length and the width of each transducer means.

It is sometimes desirable to use two transducer positioning means 41 positioned in tandem and operating so that the cylindrical, rotatable member in each positioning means is alternately stepped. This enables a larger number of transducers to operate on a given width of recording surface and provides the necessary number of stepping positions per revolution.

While there have been disclosed herein illustrated embodiments of the present invention, various changes in material and arrangements as well as various modifications, omissions, and refinements which depart from the disclosed embodiments may be adopted without departing from the spirit and scope of the present invention which is limited only by the following claims.

We claim:

1. A transducer positioning means for raising and lowering a plurality of electromagnetic transducers in relation to the surface of a magnetic recording drum comprising,
    (a) a cylindrical, rotatable member disposed parallel to the axis of said drum, (b) a plurality of indentations arranged around the circumference of said member in a predetermined manner,
(c) individual holding means for each of said transducers wherein each of said means is separately movable upward and downward with respect to said surface of said drum,
(d) a button projecting downwardly from each of said holding means for engaging said indentations, and
(e) a pulse motor arrangement for rotating said rotatable member in incremental movements.

2. A transducer positioning means according to claim 1, wherein each of said holding means is pivotally mounted at one end thereof.

3. A field recording and playback system for seismic weight dropping operations comprising,
(a) at least one seismometer means for converting seismic signals into electrical signals,
(b) a first multicontact sequential switch connected to the output of said seismometer means,
(c) a first plurality of electromagnetic transducers electrically connected to said first switch,
(d) a first magnetic recording surface associated with said first transducers,
(e) an addition circuit electrically connected to said first transducers,
(f) a second multicontact sequential switch connected to the output of said addition circuit,
(g) a second plurality of electromagnetic transducers electrically connected to said second switch,
(h) a second magnetic recording surface associated with said second transducers,
(i) a transducer positioning means for mechanically raising and lowering selected transducers of said first and second transducers,
(j) first, second and third pulse motors mechanically connected to said first switch, said second switch, and said transducer positioning means, respectively, and
(k) a switching control unit including an array of relays and at least one holding circuit electrically connected to said pulse motors and adapted to control operations thereof.

4. A system as set forth in claim 3 wherein first and second indicator tubes are mechanically linked to said first and second switches, respectively.

5. A system as set forth in claim 3 wherein a playback switching means including a third multicontact sequential switch, and a potentiometer ganged to a third pulse motor is electrically connected to said second transducers.

6. A system as set forth in claim 5 wherein a servo operated writing element associated with a third recording surface is connected to the output of said playback switching means.

References Cited by the Examiner
UNITED STATES PATENTS

| | | | |
|---|---|---|---|
| 2,771,596 | 11/1956 | Bellamy | 340—177 |
| 2,851,121 | 9/1958 | McCollum | 181—.5 |
| 3,042,864 | 7/1962 | Godbey | 324—77 |
| 3,088,094 | 4/1963 | Heintz et al. | 346—74 |
| 3,193,811 | 7/1965 | Clarke et al. | 340—174.1 |

BENJAMIN A. BORCHELT, *Primary Examiner.*

W. KUJAWA, *Assistant Examiner.*